United States Patent [15] 3,689,756
Haigh [45] Sept. 5, 1972

[54] ELECTRO-MECHANICAL FUNCTION GENERATOR

[72] Inventor: Richard Wolliscroft Haigh, Beauchamp near Worcester, England

[73] Assignee: Joseph Lucas (Industries) Limited, Birmingham, England

[22] Filed: May 21, 1969

[21] Appl. No.: 826,484

[52] U.S. Cl. ..............................235/197, 235/61.6 A
[51] Int. Cl. ..............................G06q 7/26
[58] Field of Search ....235/61.6 A, 61.6 B, 197, 151, 235/151.11, 151.1; 318/20.130, 20.100; 346/33

[56] References Cited

UNITED STATES PATENTS 3,329,804 7/1967 Anderson et al......235/61.6 A
3,307,019 2/1967 Woodard et al. ......235/61.6 A
3,410,956 11/1968 Grossimon et al......235/61.6 A UX
3,441,922 4/1969 Thompson............235/61.6 A
3,486,018 12/1969 Warren......................235/197

*Primary Examiner*—Joseph F. Ruggiero
*Attorney*—Holman and Stern

[57] ABSTRACT

A function generator for producing an output signal which is a known function of two independent parameters includes a conductor pattern on a support which can be moved in a predetermined path in accordance with the value of first parameter. The conductor pattern defines a family of curves of the required function plotted against the first parameter, for a number of constant values of the second parameter. A chain of impedances is also carried by the support and each conductor curve is connected to a junction between a pair of these impedances. A.C. signals of opposite phase are applied across the impedance chain, and at least one of these signals is varied in accordance with the first parameter. There occurs therefore on the impedance chain a zero point whose position is dependent on the first parameter, the the conductor, or conductors, nearest that point will be at or near zero.

A pick-up is movable by a servo system in a path transverse to that of the conductor pattern and in a direction to seek the conductor at or near zero. The displacement of the pick-up from a datum, or rest, position provides a signal corresponding to the required function.

19 Claims, 10 Drawing Figures

INVENTOR
Richard Wooliscroft Haigh
BY Holman, Glascock, Downing & Seebold
ATTORNEYS INVENTOR
Richard Wooliscroft Haigh
BY Holman, Glascock, Downing & Seebold
ATTORNEYS INVENTOR
Richard Wooliscroft Haigh
BY Holman, Glascock, Downing & Seebold
ATTORNEYS INVENTOR
Richard Wooliscroft Haigh
BY Holman, Glascock, Downing & Seebold
ATTORNEYS INVENTOR
Richard Wooliscroft Haigh
BY Holman, Glascock, Downing & Seebold
ATTORNEYS INVENTOR
Richard Wooliscroft Haigh
BY Holman, Glascock, Downing & Seebold
ATTORNEYS

ELECTRO-MECHANICAL FUNCTION GENERATOR

This invention relates to an electro-mechanical function generator for producing an output signal which is a known function of two independent parameters.

A function generator in accordance with the invention comprises a plurality of conductors on a support movable along a first predetermined path in accordance with the value of one of the said parameters, a capacitive pick-up device movable relative to the said support along a second predetermined path transverse to the said first path, the said conductors defining a family of non-intersecting curves representing graphs of the required function against said one parameter for a plurality of constant values of the other parameter in a coordinate system determined by the first and second predetermined paths, a chain of impedances, the interconnections of which are connected to the said conductors respectively, A.C. source means connected to said chain of impedances for applying to opposite ends of said chain A.C. signals of opposite phase, whereby at a predetermined point on said chain no A.C. signal is present, said A.C. source means incorporating means responsive to the value of the said other parameter for varying the A.C. signal at at least one end of the impedance chain so as to vary the position of the predetermined point along the said chain, a servo system responsive to a signal received by the pick-up device from the conductors and operating to urge the pick-up device towards an equilibrium position dependent on the position of the support on the said first path and the position of the said predetermined point on the said impedance chain, an output signal corresponding to the value of the function being derived from the servo mechanism.

A function generator according to the invention will now be described by way of example and with reference to the accompanying drawings in which.

Figure 1:
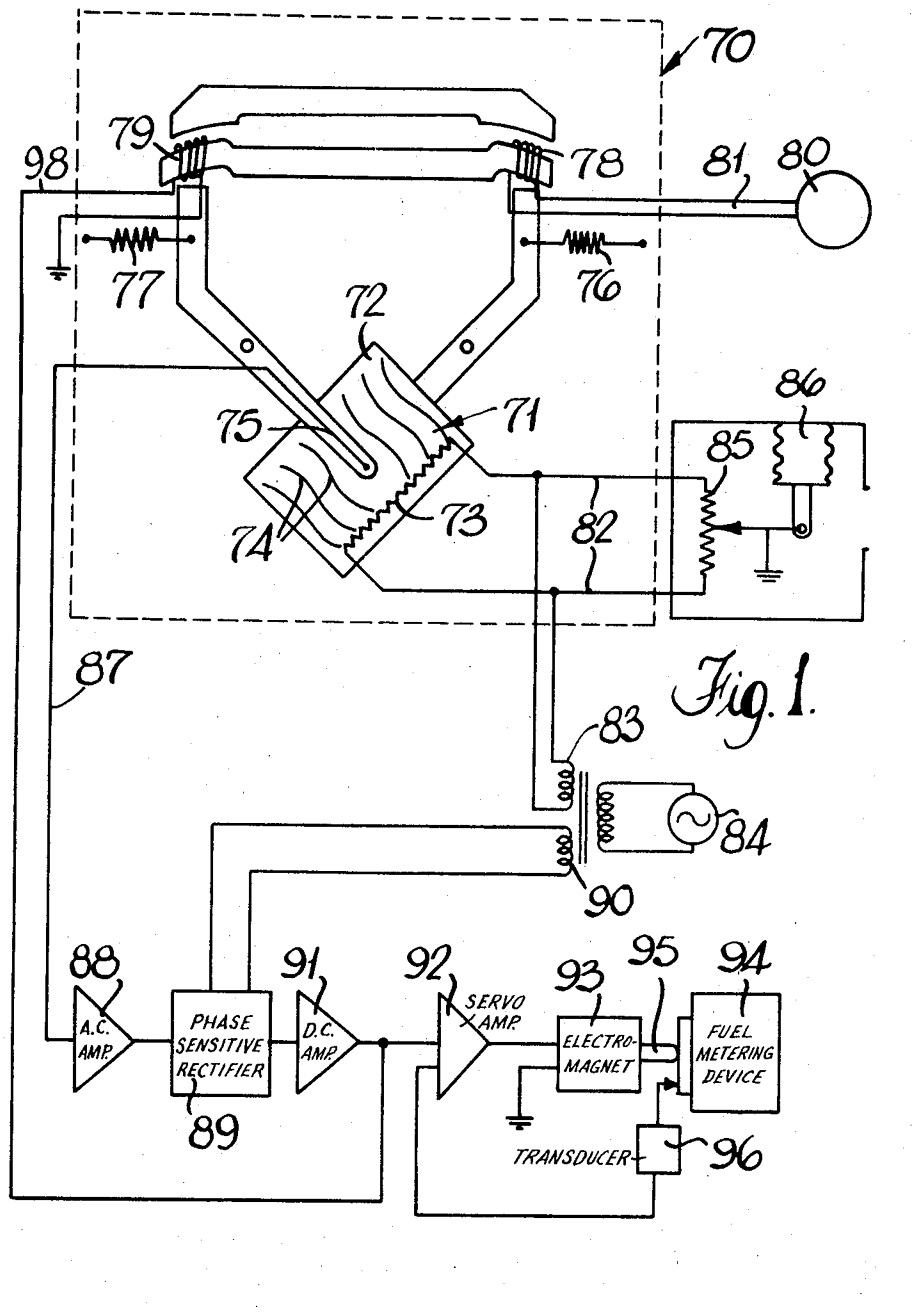
FIG. 1 shows diagrammatically a function generator.

Referring first to FIGS. 2 to 6, a panel 10 has secured thereto a pair of bar magnets 11, 12 in spaced relationship and with the north pole of one magnet adjacent the south pole of the other. Yokes 13, 14 and brackets 15, 16 are screwed to the ends of the magnet 12. Each yoke has mounted thereon a pair of bushes 17. Spindles 18, 19 are rotatably mounted in bearings 20 in the bushes 17.

Figure 2:
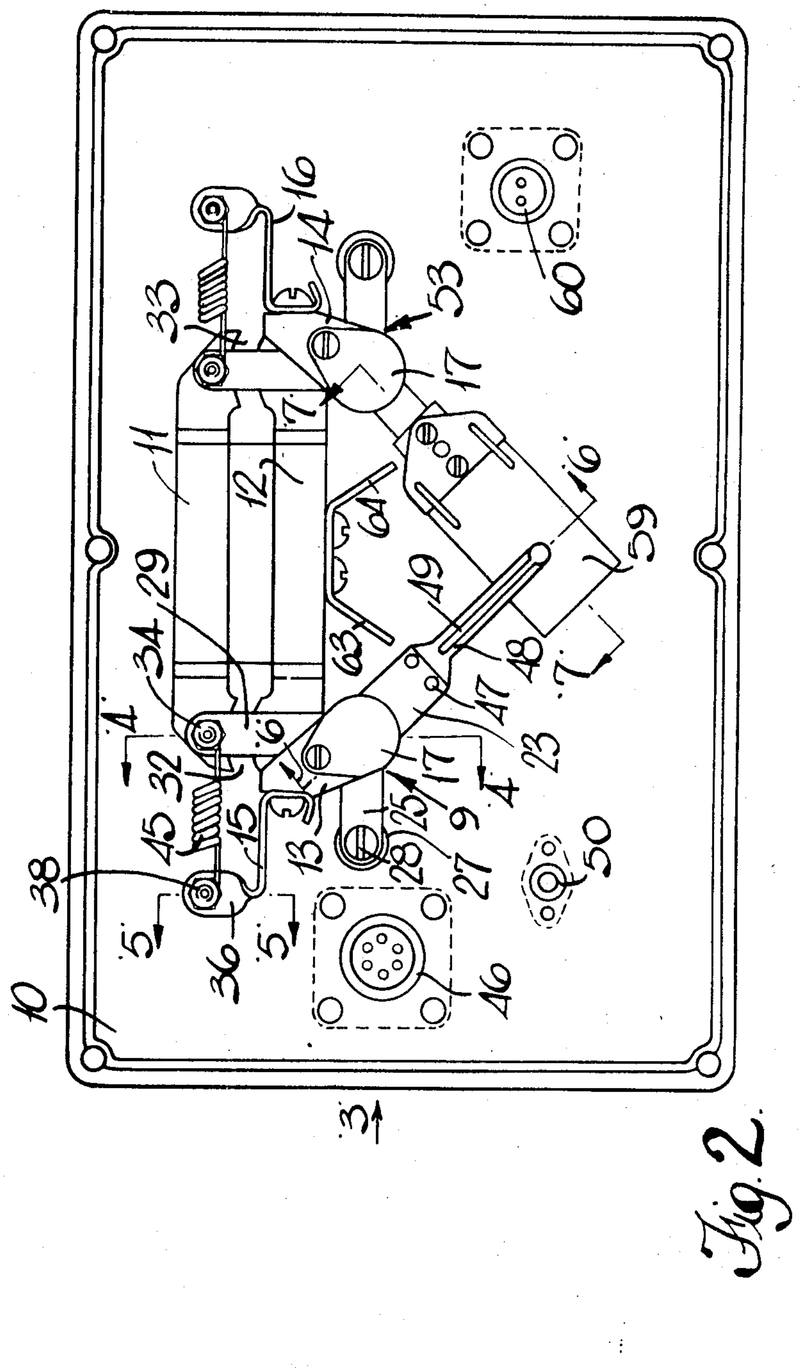
FIG. 2 shows a mechanical arrangement of a part of the function generator.
Figure 3:
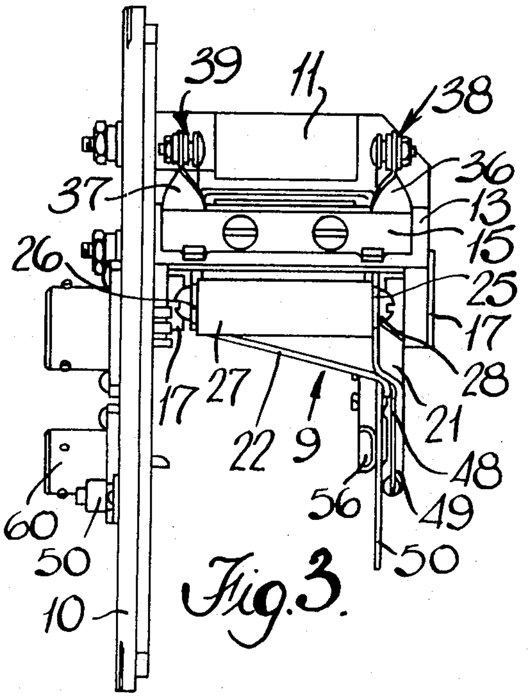
FIG. 3 shows a view on arrow 3 in FIG. 2.
Figure 4:
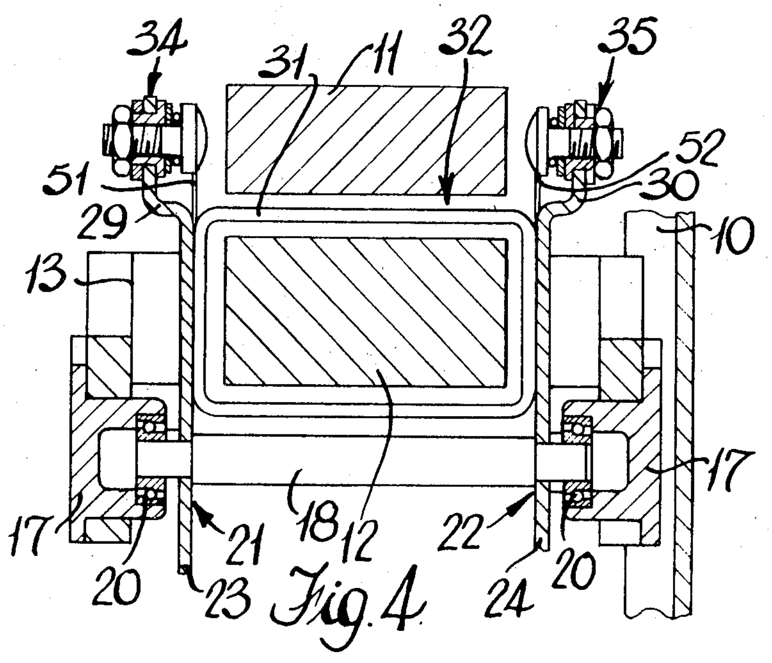
FIGS. 4 to 7 show on a different scale the part sections of FIG. 2 indicated by the correspondingly numbered section lines thereon.
Figure 5:
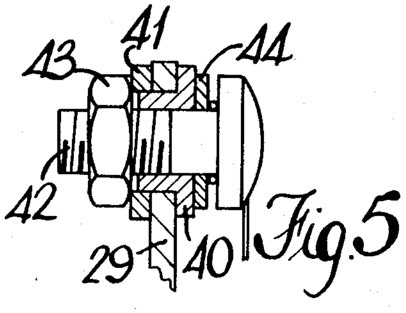
Figure 6:
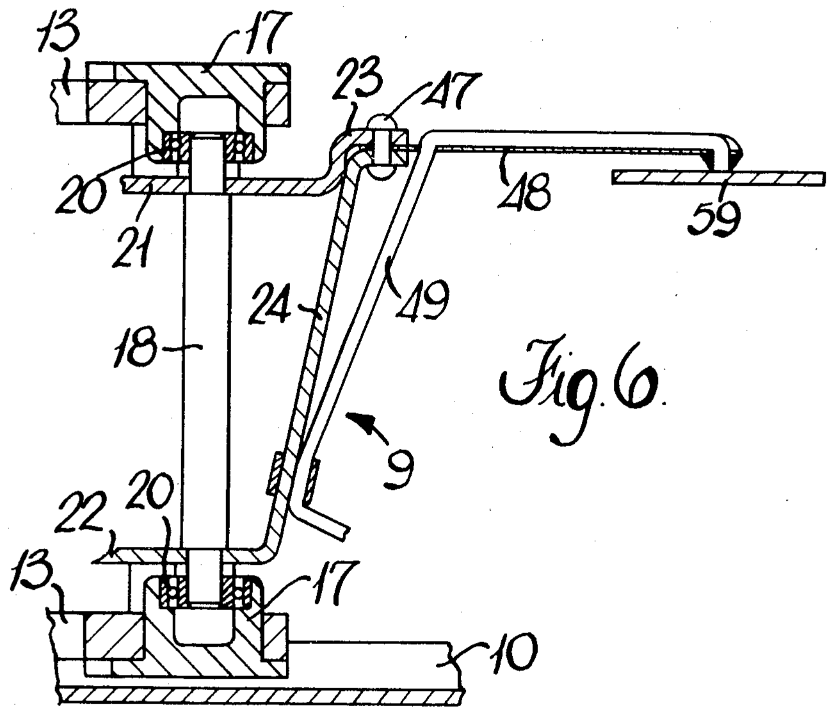
Figure 7:
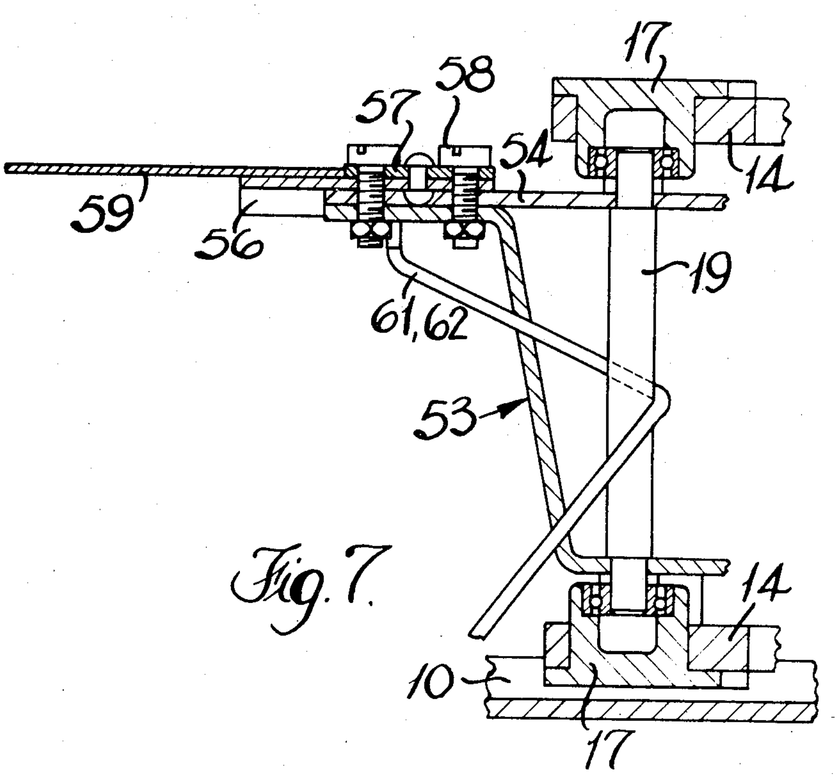

Fixedly engaged against shoulders at either end of the spindle 18 is a lever assembly 9 which includes sheet metal lever members 21, 22 which are, as seen in plan in FIG. 2, generally Y-shaped. The legs 23, 24 of the members 21, 22 respectively are cranked and adjoin each other adjacent the end of the spindle 18 remote from the plate 10. Arms 25, 26 of the members 21, 22 respectively extend parallel to each other and support between them a cylindrical counterweight 27 secured by screws 28. Arms 29, 30 of the members 21, 22 respectively also extend parallel to each other and support between their ends a coil 31 which surrounds one pole of the magnet 12. The gaps 32, 33 between the adjacent poles of the magnets 11, 12 are of arcuate form about centers which correspond to the axes of the spindles 18, 19.

Each of the arms 29, 30 carries a terminal assembly 34, 35. Upset tabs 36, 37 carry terminal assemblies 38, 39, one of which is shown in detail in FIG. 5, substantially identical to the assemblies 34, 35. Each such assembly comprises an insulating bush 40, an insulating washer 41, a bolt 42, a nut 43 and a plain washer 44. An extension spring 45 has its respective ends engaged by the assemblies 34, 38. A similar spring (not shown) is engaged between the assemblies 35, 39. Each end 51, 52 of the coil 31 is soldered to a corresponding one of the assemblies 34, 35. A plug 46 on the panel 10 has two of its terminals connected by leads to the assemblies 38, 39 in a similar manner. The extension springs complete the electrical connections between the coil 31 and the plug 46.

An arm 48 is secured to the lever assembly 9 between the legs 23, 24 of the members 21, 22, by means of rivets 47, and extends therefrom in cantilever fashion. One end of an insulated and screened flexible lead 49 passes through a hole in the extremity of the arm 48 and is secured thereto by soldering. The lead 49 extends along the arm 48, through which it passes at a second point to connect with a plug 50 on the panel 10.

Engaged on the spindle 19 is a rotatable lever assembly 53 substantially similar to the lever assembly 9 and which is associated with terminal assemblies on the bracket 16, the magnet 12 and terminals in the plug 46 in alike manner to that previously described. However, of the lever members 54, 55 which form part of the lever assembly 53, only one, lever member 55, is cranked. A channel-section stiffening member 56 is rivetted to a backing plate 57. The members 54, 55, 56 and the plate 57 are secured together by bolts and nuts 58. A glass plate 59 is adhesively attached to the member 56 and extends in cantilever fashion therefrom. The arm 48 and the plate 59 are therefore movable in mutually transverse arcuate paths.

The plate 59 forms a support for a conductor pattern deposited thereon and later to be described. The conductor pattern is connected to a plug 60 by a pair of flexible leads 61, 62. The plate 59 and conductor pattern are preferably coated with a layer of insulating material. Alternatively it may be arranged that the ends of the arm 48 and lead 49 are insulated from the plate 59. The distance of the plate 59 and the arm 48 from the panel 10 is such that they are in light sliding contact. The lead 49 thereby acts as a capacitive pick-up for signals in the conductor pattern on the plate 59. Stops 63, 64 are secured to the magnet 12 and serve respectively to limit the travel of the lever assemblies 9, 53.

An apparatus substantially as previously described is shown diagrammatically at 70 in FIG. 1 associated with other components with which it combines to form a function generator in accordance with the invention and intended for use in a petrol injection system for a piston engine, it being required to vary the quantity of petrol injected in each cycle as a function of the engine speed and manifold pressure. A conductor pattern 71 is deposited as a metal film on the plate 72 and is in the form of a resistance chain 73 and a plurality of conductors 74 which define the graphs of the values of the function against values of the engine speed for a plurality of constant values of the manifold pressure. The co-ordinates in which the graphs represented by the conductors 74 are plotted, are chosen so as to take the arcuate movements of the plate 72 and pick-up 75 into account. Springs 76, 77 act so as to define for the plate 72 and pick-up 75 respectively unique equilibrium positions in accordance with the currents flowing in the associated coils 78, 79. Current in the coil 78 is derived from a tacho generator 80 connected thereto by leads 81.

The resistance chain 73 is connected by flexible leads 82 to opposite ends of a secondary winding 83 of a transformer, the primary winding of which is connected to an A.C. source 84 producing an oscillating signal with a frequency in the region of 5,000 C.P.S. Bridging the secondary winding 83 is a potentiometer 85 the variable point of which is earthed and is movable by a capsule 86 to the outside of which the manifold pressure is applied. The pick-up 75, which is screened around its edges, is connected via a screened cable 87 to an A.C. amplifier 88 tuned to resonate at the frequency used, and having a zero phase shift at that frequency. The output of the amplifier 88 is fed to a phase sensitive rectifier 89 which also receives an input signal from a further secondary winding 90 of the transformer of which the winding 83 forms part. The D.C. output of the rectifier 89, which will be of positive or negative polarity according to whether the signal from the amplifier 88 is in phase or is in anti-phase with the signal from the winding 90 respectively, is fed to a D.C. amplifier 91 the output of which is utilized to energize the coil 79. Flexible leads 98 connect the ends of the coil 79 to the output connection of the amplifier 91 and to earth respectively.

In use, the ends of the potentiometer 85 will be at A.C. potentials dependent upon the position of the variable point thereof. Furthermore the phases of the signals at the two ends of the potentiometer 85 will be opposite, so that there will be a point on the resistance chain 73 at which the amplitude of the A.C. signal will be zero. The conductor 74 connected to the chain nearest this point will be substantially at earth potential therefore. The A.C. potentials of the conductor 74 on opposite sides of this earth potential conductor will increase gradually away from that conductor and those on one side of this conductor will be of opposite phase to those on the other side. Thus, as the pick-up 75 is moved along its predetermined path it will receive substantially no signal when situated directly over the conductor at earth potential. Movement of the pick-up in opposite directions from this conductor will cause the signal picked up by the pick-up 75 to increase.

It will thus be seen that the output of the amplifier 91 can be used to urge the pick-up 75 towards the conductor at earth potential. Variation in the speed of the engine, as sensed by the Tacho-generator 80 will cause variations in the position of the pick-up 75, as will independent variations of the manifold pressure.

The force applied by the spring 77 will vary as its extended length. The pick-up 75 will not therefore be in equilibrium over a conductor 74 which is at or near earth potential, but at a point where the A.C. signal picked up from the conductors 74 is sufficient to produce a current in the coil 79 which results in a force equal to that exerted by the spring 77. The output from the amplifier 91 will therefore be proportional to the displacement of the pick-up from a datum at which the spring is at its minimum extension.

The output of the amplifier 91 forms one input of a servo amplifier 92, the output of which is, in turn, used to energize an electro-magnet 93 which operates a fuel metering device 94. The position of the armature 95 of the electro-magnet 93, and hence of the co-acting portion of the device 94 is detected by a displacement transducer 96, the output of which forms a second input of the servo amplifier 92. The output of the servo amplifier is thus proportional to the output of the amplifier 91 minus any feedback signal derived from the transducer 96.

The device 94 determines exactly what quantity of fuel is injected into the inlet port of each cylinder of the engine following the induction stroke thereof.

Figure 8:
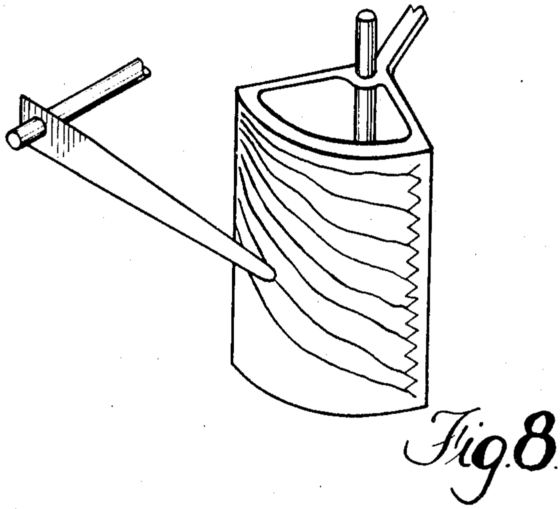
FIG. 8 shows an alternative form of a support and pick-up.

In an alternative arrangement the plate 72 may be replaced by a cylinder, or part thereof as shown in FIG. 8, which is rotated by means of a coil and co-acts with a pick-up substantially as previously described. In this case the axes of rotation of the cylinder and the pick-up would be mutually perpendicular.

Instead of the coil 79 co-acting with a magnet the means for moving the pick-up 75 may comprise a servo mechanism which does not require a constant current input to maintain it in position against an externally applied force, as for example a motor-driven cam. The output signal corresponding to the value of the function is in this case effectively a position. The spring 77 may then be dispensed with, and the pick-up 75 will therefore come to rest so that the signal it receives from the conductors 74 has always a constant value. This value will conveniently be zero.

Provided that the impedance of the conductor pattern 71 is high with respect to the A.C. source, and low with respect to earth, the resistance chain 73 may be replaced by a chain of capacitances or inductances, since the voltage phase-relationship at either end of the conductor pattern 71 will not be affected thereby.

Further parameters may be introduced into the control of the fuel metering device by incorporating temperature sensitive devices, sensitive to atmospheric temperature and engine coolant temperature respectively. These devices may be in the form of temperature sensitive resistors introduced into the connection between the amplifier 91 and the coil 79 and the amplifier 91 and the servo amplifier 92. These resistors may have associated with them amplifiers if this is considered necessary. The result of these additions would be to alter the ratio of the currents fed to the moving coil 79 and the electro magnet 93, and thus to produce the required proportional changes in fuel delivery in response to the variations in the two temperatures.

If a large number of conductors are used, and the pick-up 75 is large enough to span the gap between two conductors at their widest spacing, smooth interpolation is obtained between adjacent conductors. As the pick-up moves from a position with its center over one conductor, to a position with its center over the next conductor, its potential will change smoothly, as the contributions from the two conductors decrease and increase respectively, thus, although no conductor may actually be at zero potential, there is always a position where the voltage picked up by the pick-up will be zero, and the servo mechanism constituted by the coil 79, the co-acting magnet and its electronic control system constituted by the amplifier 88, the rectifier 89 and the amplifier 91 will urge the pick-up towards this position.

The screening of the pick-up will give it a much larger capacity to earth than to the conductors. If the A.C. amplifier input impedance is high compared with the reactance of this capacity to earth, the voltage of the pick-up will be in phase with one pole or the other of the A.C. supply.

It will be appreciated that the function generator described can be used in other applications, with particular advantage if either or both inputs are remote, the only connections required being an electrical connections to the resistance chain and/or the coil 78. The potentiometer 85 could be replaced by alternative signal sources, for instance two resistors one fixed and one sensitive to a temperature.

Figure 9:
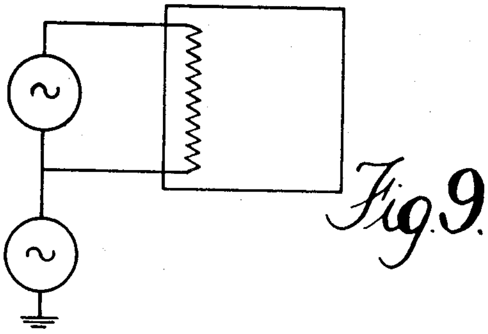
FIGS. 9 and 10 show alternative forms of A.C. source.

Alternatively, as shown in FIG. 9 a fixed-value A.C. source is connected across the impedance chain, and a second A.C. source, or opposite phase and whose amplitude is dependent on the value of the second, or other, parameter is connected thereto so that the signals supplied by the two sources are summed.

Figure 10:
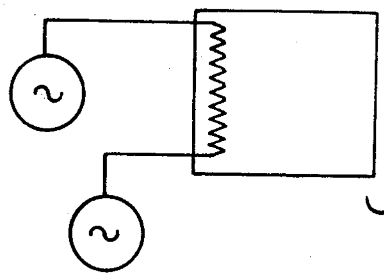

In yet another alternative, as shown in FIG. 10, two A.C. sources, the signals from either or both of which are variable in accordance with the said other parameter, are connected, one at each end of the impedance chain.

Other types of servo mechanism could be employed instead of the purely electrical servo mechanism shown. It will also be appreciated that the family of curves represented by the conductors 74 would be varied in accordance with the co-ordinate system defined by the paths of movement of the pick-up and the support for the conductors. In a simple example, these two paths are straight lines at right angles, in which case the family of curves would be plotted in Cartesian co-ordinates.

Having thus described my invention what I claim as new and desire to secure by Letters Patent is:

1. A function generator comprising a plurality of conductors on a support movable along a first predetermined path in accordance with the value of one of the said parameters, a capacitive pick-up device movable relative to the said support along a second predetermined path transverse to the said first path, the said conductors defining a family of non-intersecting curves representing graphs of the required function against said one parameter for a plurality of constant values of the other parameter in a co-ordinate system determined by the first and second predetermined paths, a chain of impedances, the interconnections of which are connected to the said conductors respectively, A.C. source means connected to said chain of impedances for applying to opposite ends of said chain A.C. signals of opposite phase, whereby at a predetermined point on said chain no A.C. signal is present, said A.C. source means incorporating means responsive to the value of the said other parameter for varying the A.C. signal at least one end of the impedance chain so as to vary the position of the predetermined point along the said chain, a servo system responsive to a signal received by the pick-up device from the conductors and operating to urge the pick-up device towards an equilibrium position dependent on the position of the support on the said first path and the position of the said predetermined point on the said impedance chain, an output signal corresponding to the value of the function being derived from the servo mechanism.

2. A function generator as claimed in claim 1 in which the support for the conductors has a substantially plane surface.

3. A function generator as claimed in claim 1 in which the support for the conductors has a surface which forms at least part of a cylinder.

4. A function generator as claimed in claim 1 in which the said first path is arcuate.

5. A function generator as claimed in claim 1 in which the said second path is arcuate.

6. A function generator as claimed in claim 1 in which the said conductors and impedances are deposited on the support as a thin film.

7. A function generator as claimed in claim 1 in which the support comprises a glass plate.

8. A function generator as claimed in claim 1 in which the impedances comprise resistances.

9. A function generator as claimed in claim 1 in which the servo system comprises amplifying and rectifying means for the signal received by the pick-up and actuating means for moving the pick-up in accordance with the magnitude and phase of the said signal.

10. A function generator as claimed in claim 9 in which the actuating means comprises a coil which coacts with a magnet.

11. A function generator as claimed in claim 1 which includes means for biasing the pick-up towards a datum position.

12. A function generator as claimed in claim 1 in which the support is coupled to a support actuating means movable in accordance with the value of the said one parameter.

13. A function generator as claimed in claim 12 in which the said support actuating means comprises a coil which co-acts with a magnet and a means for biasing the support towards a rest position.

14. A function generator as claimed in claim 13 in which the magnet associated with the support actuating means and a magnet associated with pick-up actuating means are formed as one magnet.

15. A function generator as claimed in claim 14 which includes a second magnet adjacent the said one magnet.

16. A function generator as claimed in claim 1 in which the chain of impedances is connected across the A.C. source means and the means for varying the A.C. signal comprises a potentiometer also connected across the A.C. source means, the variable point of the potentiometer being earthed and movable in accordance with the value of the said other parameter.

17. A function generator as claimed in claim 1 in which the said A.C. source means comprises a first A.C. source connected across the chain of impedances and supplying a signal of a fixed value and the means for varying the A.C. signal comprises a second A.C. source of opposite phase and whose amplitude is dependent on the value of the said other parameter, the outputs of the two A.C. sources being summed.

18. A function generator as claimed in claim 1 in which the said A.C. source means comprises a first A.C. source connected to one end of the impedance chain and a second A.C. source connected to the other end of the impedance chain, the signals from either or both A.C. sources being variable in accordance with said other parameter.

19. A function generator as claimed in claim 1 in which the output of the servo system forms one input of a servo amplifier whose other input is supplied from a transducer operated by an apparatus with which the function generator, in use, co-acts.

* * * * *